United States Patent [19]
Holly

[11] 3,909,880
[45] Oct. 7, 1975

[54] MOLDING APPARATUS
[75] Inventor: Harry H. Holly, Olympia Fields, Ill.
[73] Assignee: Hollymatic Corporation, Park Forest, Ill.
[22] Filed: Oct. 27, 1972
[21] Appl. No.: 301,625

Related U.S. Application Data
[63] Continuation-in-part of Ser. No. 244,027, April 14, 1972.

[52] U.S. Cl. .................. 17/32; 425/149; 425/154; 425/217; 425/441
[51] Int. Cl.² .......................................... A22C 7/00
[58] Field of Search .............................. 17/32–41; 425/441

[56] References Cited
UNITED STATES PATENTS

| | | | |
|---|---|---|---|
| 577,494 | 2/1897 | Schoenland | 17/40 |
| 2,630,390 | 3/1953 | Carruthers | 17/32 X |
| 2,889,574 | 6/1959 | Thielen et al. | 17/39 X |
| 3,417,425 | 12/1968 | Holly | 17/32 |
| 3,433,647 | 3/1969 | Johnston | 17/32 X |
| 3,588,948 | 6/1971 | Holly | 17/32 |

OTHER PUBLICATIONS
Japanese Utility Model Application Publication No. 10875; 1967 June.

Primary Examiner—Richard C. Pinkham
Assistant Examiner—Joseph R. Taylor
Attorney, Agent, or Firm—Hofgren, Wegner, Allen, Stellman & McCord

[57] ABSTRACT

A molding apparatus for forming articles and specifically edible patties from such moldable materials as ground meat, fish or the like in which the apparatus includes a movable mold. Pressure is applied to the material in a compression chamber for injection of the material through a passage into a shaping cavity. A closure valve between the pressure source and the mold movable between passage opening and passage closing positions is provided. The pressure source is a ram containing a pressure release passage with an entrance at the compression chamber and an exit into the material supply for directing meat through the passage back to the supply on malfunction. Seals are also included for preventing leakage in the high pressure portions of the apparatus. An improved system is provided for removing the shaped articles from the shaping cavities with the apparatus of this removal system moving with the movable mold so as to maintain high speed operation. Also provided is a pump structure for intercepting leakage material on the mold which is especially useful when the material is ground raw meat with this material either being returned to the supply hopper or ejected away from the mold articles as desired.

2 Claims, 14 Drawing Figures

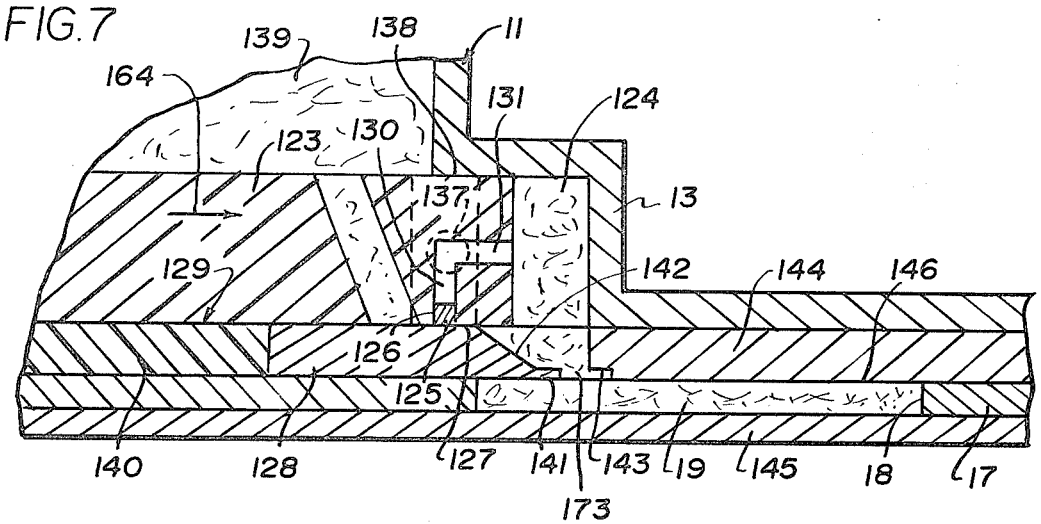
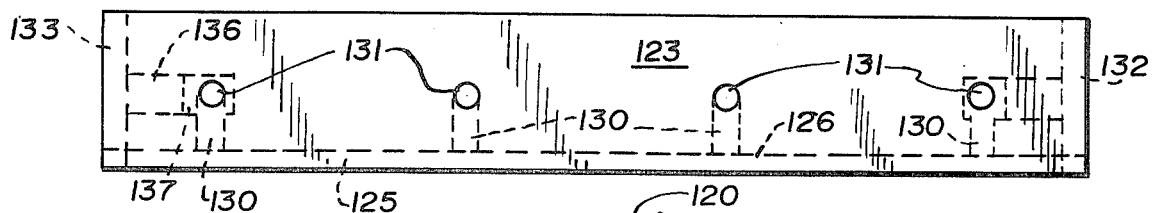
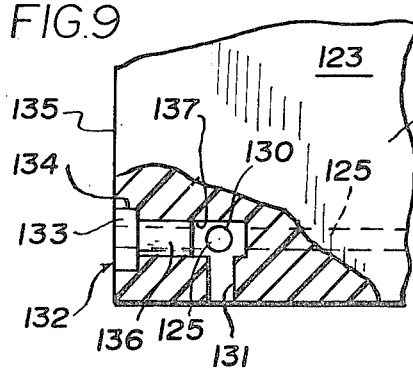
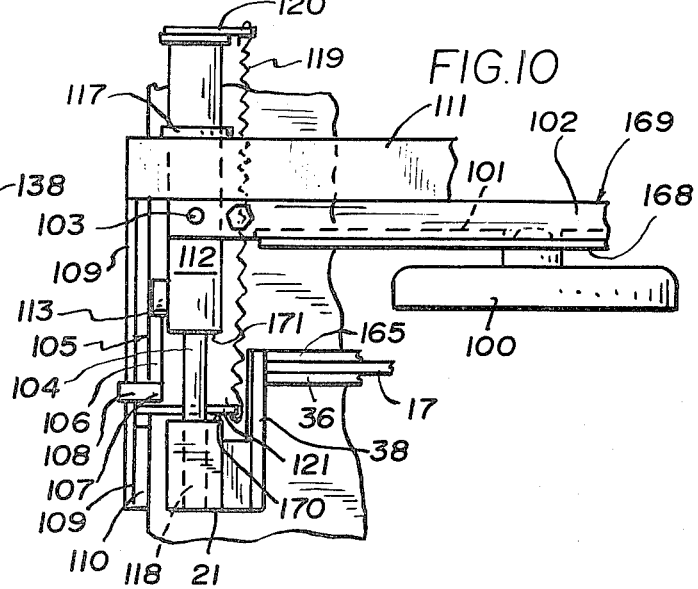

MOLDING APPARATUS

CROSS REFERENCE TO RELATED APPLICATION

This application is a continuation-in-part of my co-pending application Ser. No. 244,027, filed Apr. 14, 1972. This prior application contains claims covering the valve disclosed herein.

BACKGROUND OF THE INVENTION

The invention relates to an improved structure for removing molded articles from the mold openings that finds particular usefulness in removing shaped patties of food material from the traveling mold plate without requiring interruption of the movement of the plate.

The most pertinent prior art of which applicant is aware is U.S. Pat. No. 3,241,178 which discloses a mechanically operated valve in a meat patty forming machine. U.S. Pat. No. 3,654,665 shows a molding apparatus embodying many of the features disclosed herein, but it does not disclose the valve of this invention or other features to be described in detail hereinafter.

BRIEF DESCRIPTION OF THE DRAWINGS

FIG. 5 is an enlarged fragmentary vertical sectional view taken along line 5—5 of FIG. 2.

FIG. 7 is an enlarged fragmentary sectional view through a ram and associated structure illustrating a second embodiment of the invention.

FIG. 8 is a front elevational view of the ram of FIG. 7.

FIG. 9 is a plan view, partially broken away for purposes of illustration, of one front corner of the ram of FIG. 7.

FIG. 10 is an enlarged fragmentary front elevational view of one end of the knockout mechanism as viewed from line 10—10 of FIG. 1.

DESCRIPTION OF THE PREFERRED EMBODIMENTS

Figure 1:
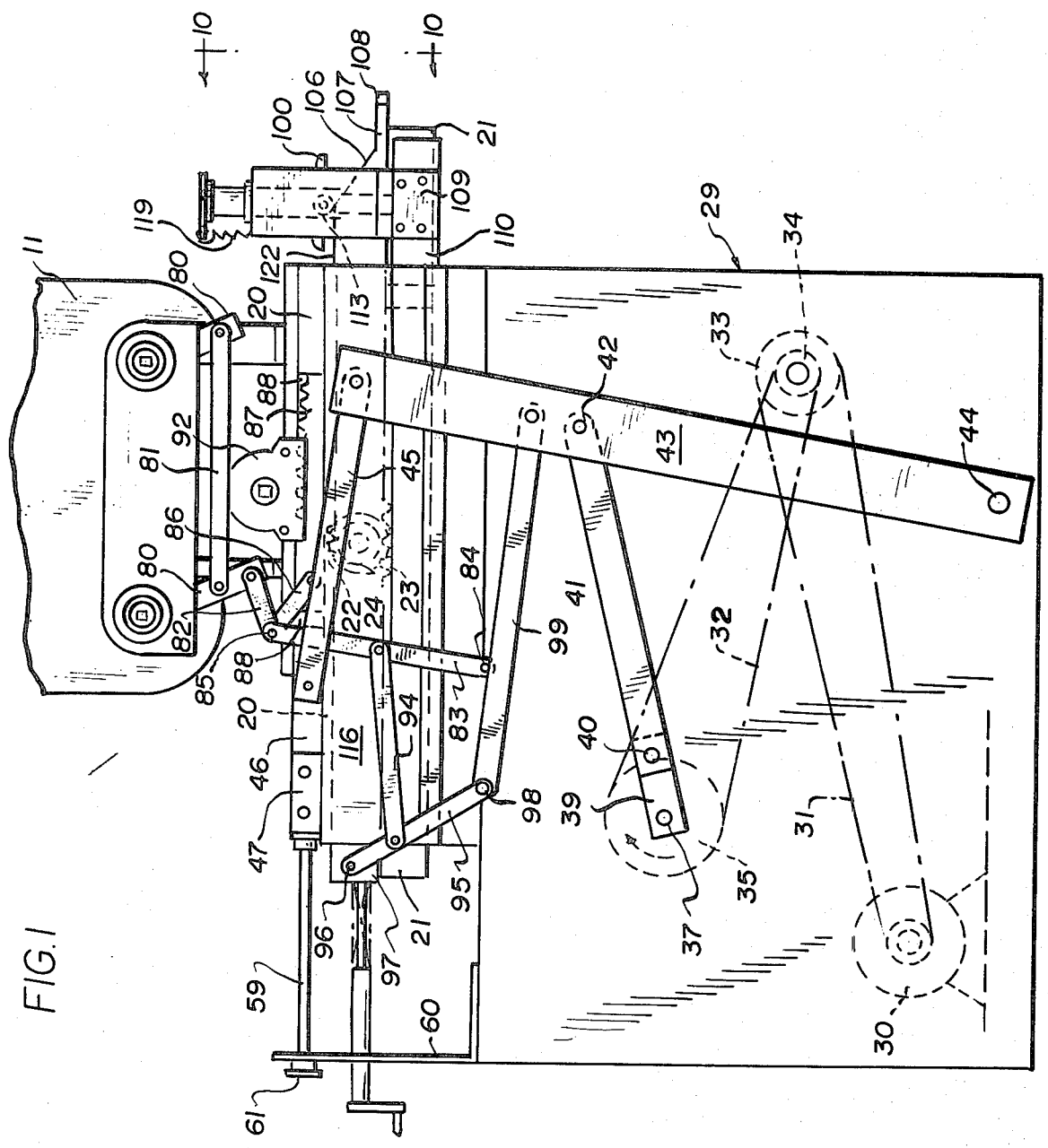
FIG. 1 is a side elevational view partially broken away of a molding apparatus embodying the invention.

In the embodiment illustrated in FIGS. 1–6 the apparatus 10 includes a hopper 11 having a lower section 12 in which is provided a generally horizontally extending compression chamber 13 having a reciprocable pressure ram 15.

THE PRESSURE OPERATED VALVE PLATE, PRESSURE RAM, MOLD PLATE AND DRIVE SYSTEM

Located at the bottom of the hopper lower section 12 with a forward end extending into the bottom of the compression chamber 13 is a slidable valve plate 14. On top of the valve plate 14 and slidable relative thereto is the pressure means ram 15 adapted to be reciprocated between the extreme positions of FIGS. 3 and 4 to apply pressure to pressure flowable moldable material 16 when this material is in the compression chamber 13 as shown in FIGS. 3 and 4.

Figure 6:
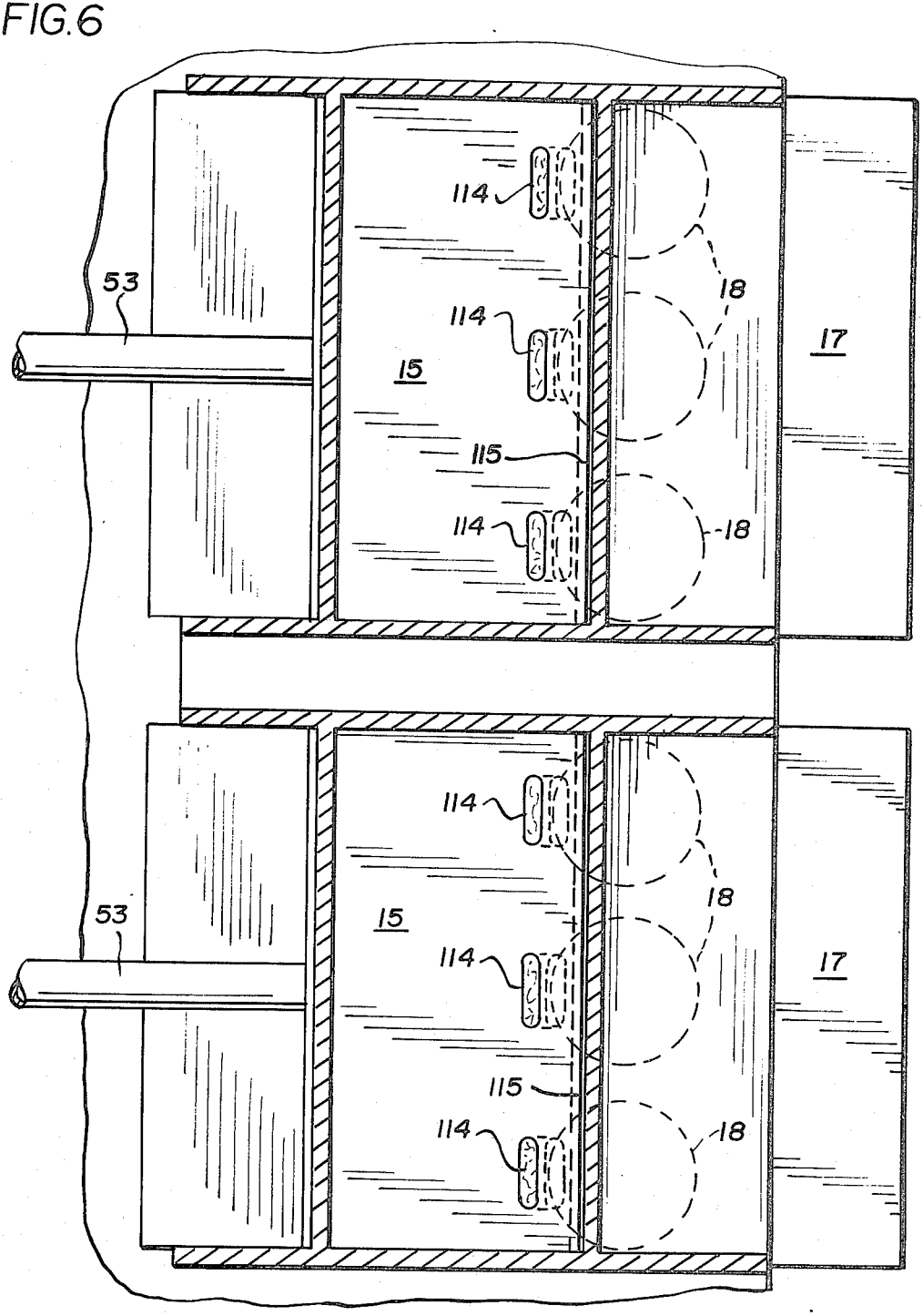
FIG. 6 is an enlarged sectional plan view taken substantially along line 6—6 of FIG. 3.

Beneath the valve plate 14 on the side opposite the ram 15 is a horizontally reciprocable mold plate 17 that has a plurality of transversely aligned mold openings 18 each of which in the embodiment illustrated as shown in FIG. 6 is circular so as to provide circular patties 19.

Figure 3:
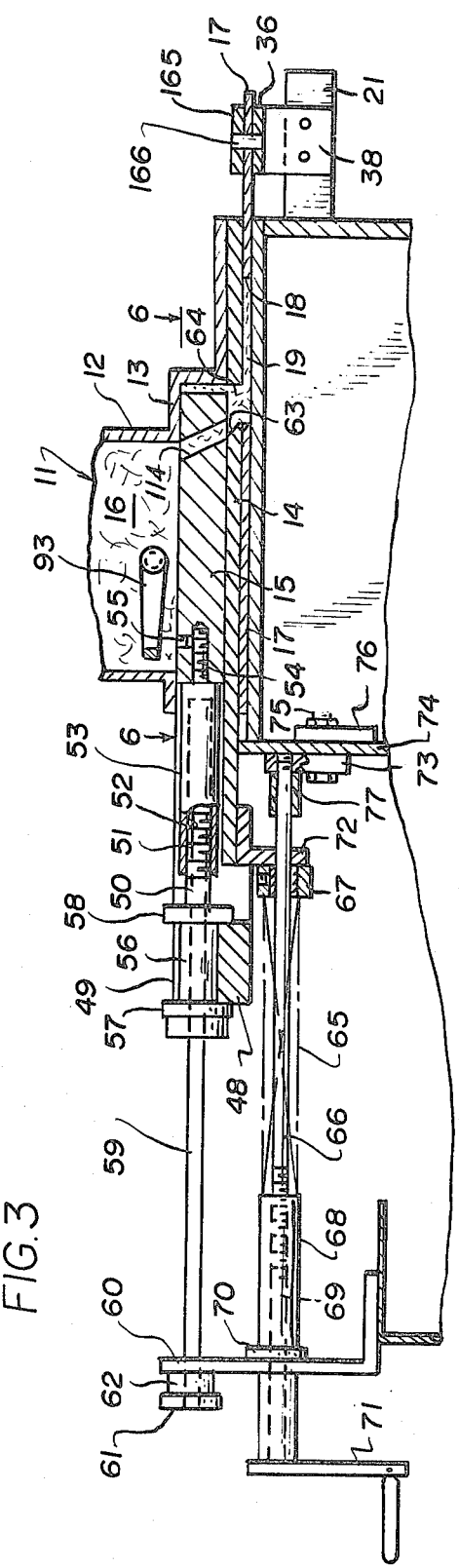
FIG. 3 is an enlarged sectional view through the pressure applying portion of the apparatus with the pressure ram in fully extended position.
Figure 4:
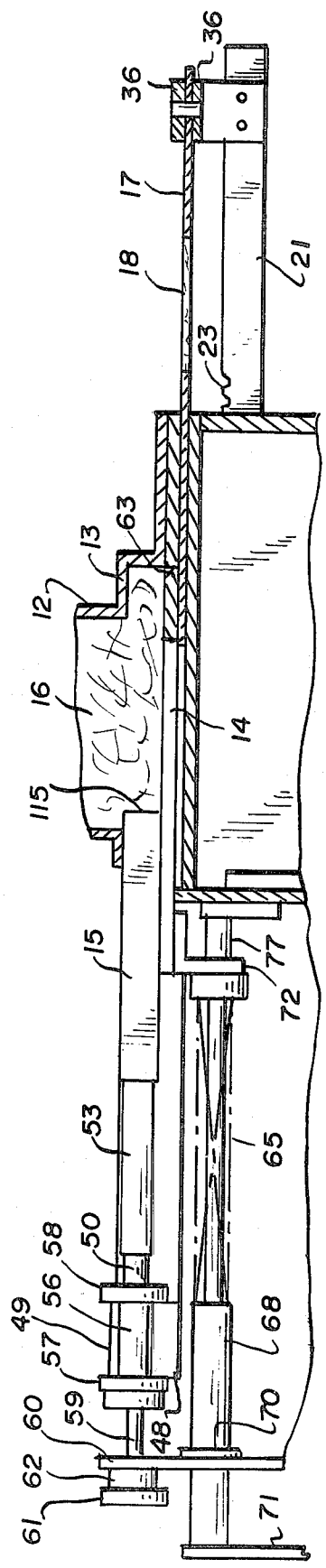
FIG. 4 is a view similar to FIG. 3 but with the ram retracted preparatory to the next pressure stroke.

The mold plate 17 is reciprocated between the filling position of FIG. 3 and the extended patty removal position of FIG. 4 by upper 20 and bottom 21 racks having teeth 22 and 23 facing each other and engaging an intermediate pinion 24 so that the two racks 20 and 21 move in opposite directions as illustrated and described in prior U.S. Pat. No. 3,417,425 and the above patent 3,654,665, both assigned to the same assignee as the present application.

There are provided two pairs of racks 20, racks 21 and pinions 24 each on opposite sides of the apparatus. The projecting ends of the bottom racks 21 are connected to the end of the mold plate 17 by a mounting strip 36 attached to the racks 21 at flange ends 38 and an overlying bar 165. The assembly of strip 36, bar 165 and intervening end of the mold plate is releasably secured by a pair of connecting pins 166. The racks and attached mold plate 17 are reciprocated back and forth with no pause except for instantaneous reversal of motion at the end of each reciprocation.

The various types of apparatus embodying the invention may utilize units of one or more mold plates, pairs of racks 20 and 21, rams 15 and other cooperating portions of the apparatus as desired to produce either single patties or a multiplicity of patties or similar articles. Thus, as exemplified in FIG. 6 there are two mold plates, rams and associated parts of the apparatus shown each forming in this embodiment three patties for a total of six for each cycle of operation of the apparatus.

Figure 2:
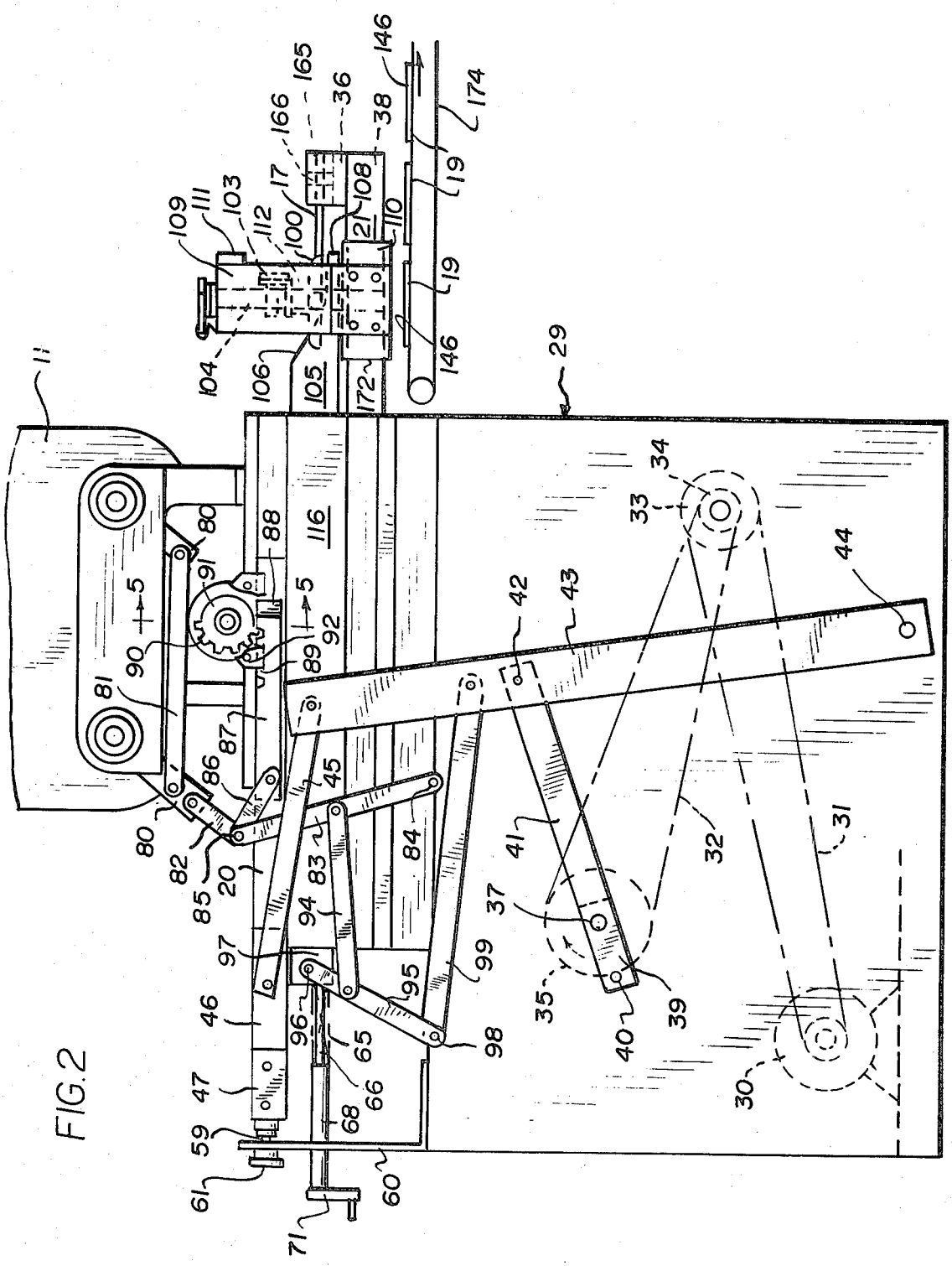
FIG. 2 is a view similar to FIG. 1 but showing the movable parts in opposite positions from the positions shown in FIG. 1.

As illustrated in FIGS. 1 and 2 where the operating parts of the machine are at their two limits of movement the apparatus is driven by a motor and lever system mounted on and housed within a cabinet 29. This cabinet contains a conventional electric motor and gear reducer combination 30 that drives a shaft 37 through a series of chains 31 and 32 and pulleys 33, 34 and 35.

Mounted on the shaft 37 and rotatable therewith is a short link 39 that is rotatably connected at its outer end by a pin 40 to a longer link 41 whose opposite end is rotatably connected by a pin 42 to an intermediate point on an elongated operating lever 43 having its lower end fulcrumed at 44. The upper or opposite end of the lever 43 is connected by a link 45 to a block 46 attached to the upper rack 20. There are two sets of links 39, 41 and 45 and levers 43 and blocks 46 with the second set being located on the opposite side of the cabinet 29.

Extending rearwardly from each block 46 is a drive bar mounting bracket 47 with a mounting being provided also on each side of the machine and between which extends a transverse drive bar 48 of the type disclosed at 52 in the above U.S. Pat. No. 3,654,665.

The drive bar 48 in the embodiment illustrated is provided with two spaced upwardly opening recesses 49 in each of which is located a ram operating shaft 50. The shaft 50 is provided with a threaded end 51 that engages a similar threaded opening 52 in the exposed edge of its ram 15 so that the ram operating shaft 50 is adjustable longitudinally relative to the ram.

Each threaded opening 52 comprises a longitudinal axial opening in a cylinder 53 that extends from its ram 15 and that is attached to its ram by an attaching screw 54 held against accidental dislodgment by a set screw 55.

The end of the ram operating shaft 50 that is opposite the adjustable end 51 is shaped roughly like a spool with a central cylindrical part 56 located within its recess 49 and with circular flanges 57 and 58 embracing the opposite surfaces of the drive bar 48.

In order to adjust the location of the path of movement of the ram 15 so as to adjust the extent of its stroke there is provided a compression adjustment rod 59 that extends between the cylindrical part 56 and a bracket 60 that is mounted on the cabinet 29. This adjustment rod 59 extends through the bracket 60 and is provided with an adjustment knob 61 for rotating the rod 59 and thus the ram operating shaft 50. With this arrangement rotating the knob 61 and thus the rod 59 moves the corresponding ram 15 either forwardly or rearwardly and thereby determines the relative position of the ram 15 at the extremes of its path of movement illustrated by the forwardmost position in FIG. 3 and the rearwardmost position of FIG. 4. In order to retain each adjustment rod 59 in its adjusted position there is provided a flat spring structure 62 between each bracket 60 and the corresponding knob 61.

Each valve plate 14 has on its end adjacent the compression chamber 13 a sloped surface 63 against which the compressed material 64 presses to move the valve plate away from the compression chamber 13 and provide access to the mold opening 18 as shown in FIG. 3. This opening movement of the valve plate 14 is opposed by a helical spring 65 that is preloaded to the desired degree to provide any required amount of resistance to movement of the valve plate.

Each spring 65 is concentric about its valve spring rod 66 with one end of each spring 65 bearing against a stop 67 and the opposite end bearing against an adjustable stop 68. The position of the tubular adjustable stop is provided by rotating a valve adjustment shaft 69 that is threaded to the stop 68. This shaft 69 extends through a bearing 70 mounted on the bracket 60 and through the bracket and is provided on its outer end with an operating handle 71 by means of which its shaft can be rotated for adjusting the load on its spring 65 as described.

Each spring 65 exerts its pressure on the corresponding valve plate 14 through a depending bracket 72 attached to the extended end of the valve plate 14. The valve spring rod 66 extends through the plate bracket 72 as illustrated in FIG. 3 and is fixed in position by being attached to a mounting plate 73 which is itself bolted to a section 74 of the cabinet 29 by means of a bolt 75 that extends through the mounting plate 73, the cabinet section 74 and a back-up plate 76. The end of the rod 66 that is retained in the mounting plate 73 is provided with a valve spring stop 77. This stop 77 is engaged by the valve plate bracket 72 when the valve plate 14 is in its closed position as shown in FIG. 4 and is spaced from the stop when the valve is in open position to apply full compressive force to the spring 65 as shown in FIG. 3. The spring 65 constantly urges the valve 14 toward its closed position, the fully closed position being illustrated in FIG. 4.

As described and claimed in the above U.S. Pat. No. 3,654,665 the hopper 11 is provided on its opposite sides with rotatable mover devices (not shown) for urging the moldable material and particularly adhesive ground meat 16 toward each ram 15. These devices are moved in increments by reciprocable levers 80 and a linkage 81 in the form of a metal strip hinged to and connecting the levers 80. In order to reciprocate one lever 80 and thus a second lever through the linkage 81 there is provided a short linkage 82 connecting the extended end of one lever 80 to a larger linkage 83 whose opposite end is mounted by a hinge pin 84 to the cabinet 29 of the machine. One end of each linkage 82 and 83 is connected by a hinge 85 which in turn is connected to one end of a short linkage 86 whose other end is hingedly connected to a small rack 87 that is slidably held in a recess 88 on one side of the upper rack 20.

While the levers and linkages for operating the ram or rams are in two sets on opposite sides of the machine there is only one set of linkages and rack 87 for operating the levers 80 and the rack 87. These of course are the linkages and hinge connections 81–86. Similarly, there is only one rack 87 on the one side of the machine.

The teeth 89 of the rack 87 engage the teeth 90 in a reciprocable rotatable pinion 91. This pinion on its outer side operates within the confines of a cover plate 92. The pinion 91 is reciprocated in a back and forth arcuate movement by the longitudinal reciprocation of the small rack 87 to reciprocate an agitator 93 within the lower section 12 of the hopper 11. The agitator 93 is similar to the one disclosed in the above prior U.S. Pat. No. 3,654,665.

In order to reciprocate the levers 80 and the small rack 87 the linkage lever 83 is connected at about its midpoint by a linkage 94 to a linkage 95 between the ends thereof, one end of which is hingedly mounted at 96 to a fixed extension 97 on the machine and the other end hingedly connected at 98 by a linkage 99 to the main operating lever 43 on its side of the machine.

Because of the relative points of connection of the linkages 83, 94, 95 and 99 to each other and then to the operating lever 43 the levers 80 and the small rack 87 move at a faster rate than do the side racks 20 that operate each ram. To provide for this increased speed the recess 88 in which the small rack 87 is located is considerably longer than the rack itself. Thus as shown in FIG. 1 in one extreme position of the operating parts the small rack 87 is at the right extreme of its recess 88 while in the opposite position of the operating parts as shown in FIG. 2 the small rack 87 is at the other end of its recess.

THE APPARATUS FOR REMOVING PATTIES FROM THE MOLD OPENINGS

In the illustrated embodiment a knockout cup 100 is provided for each mold opening 18 to remove the formed patties 19 from the openings 18 and drop them onto a conveyor 174 (FIG. 2).

The inverted knockout cups 100 of which one is provided for each mold opening 18 are mounted on a flat strip 168 with an overlying angle bar 169 (FIG. 10). The angle bar 169 has a horizontal part 101 overlying the strip 168 and a vertical part 102. The cup mounting structure 168–169 is bolted by a bolt 103 at each end to an enlarged section 112 of a vertical slide rod 104.

Attached to each side of the frame 29 of the machine is a horizontally extending cam plate 105 (FIGS. 1, 2 and 10) having a downwardly and forwardly sloped cam surface 106. There is provided one cam plate 105 on each side of the machine and each cam plate at the bottom of the inclined cam surface 106 has a horizontal extension 107 terminating in a horizontal outwardly extending right angle flange 108 acting as a stop. When the knockout cups 100 and associated elements are in their lowermost positions as shown in FIG. 2 with the cups 100 within the mold openings in removing patties 19 therefrom and depositing them on the conveyor 174 the side flanges 108 operate as forward stops for limiting the extent of movement of vertical bars 109 which are attached at each of their bottom ends to a slide block 110 that slides on the bottom rack 21. The two vertical bars 109 carry the inverted cup 100 knockout structure and are connected at their tops by a horizontally extending tie bar 111.

The opposite ends of the knockout cups mounting structure 168–169 are attached to the enlarged portion 112 of the vertical slide rods 104. When the mounting structure is in elevated position as shown in FIG. 10 it is directly beneath the tie bar 111. Each rod portion 112 carries on its outer side a roller 113 (FIG. 10) adapted to ride on the top edge of a cam plate 105 including the angled cam surface 106.

Each vertical slide rod at its enlarged portion 112 is vertically slidable in a side bushing 117 attached to a vertical bar 109 in the vicinity of its tie bar 111 connection. The bottom ends of these rods 104 slide on the top surfaces 170 (FIG. 10) of side racks 21. In the illustrated embodiment there is enough friction and enough adhesion caused primarily by meat juices to carry the slide blocks 110 and structure attached to the slide blocks along with the side racks 21 until the blocks are stopped by end stops 29 and 108.

When the bottom racks 21 have been retracted fully as shown in FIG. 1 so that the rear ends of the slide blocks 110 abut against the front of the machine frame 29 acting as a stop the knockout cups 100 structure will have been raised to its most elevated position by the rollers 113 being at the tops of the substantially parallel inclined cam edges 106. The mold plate is also retracted so that the mold openings are again in filling position (FIGS. 3 and 6). Then when the bottom racks 21 are projected forwardly after the mold openings 18 have been filled with ground meat as described to form the transverse series of patties the front edges of the vertical bars 109 engage the laterally extending stop flanges 108. At this location the side bars 109 and knockout structure carried thereby remain in knockout position while the side racks 21 and the attached mold plate 17 continue their forward movement.

When the side racks 21 and attached mold plates 17 have reached the furthest extent of their forward movements the knockout cups 100 are then directly vertically aligned with the mold openings 18 and the shaped patties 19 therein. At this position the bottom ends of the slide rods 104 are over the vertical openings 118 in the top surfaces 170 of the side racks 21 as previously described.

When this alignment of the rods 104 with the openings 118 occurs side springs 119 attached to top flanges 120 on the vertical rods 104 snap the knockout structure downwardly to the position shown in FIG. 1 where the bottom ends 171 of the enlarged portions 112 are now in engagement with the bottom rack top surfaces 170. This snap-action lowering of the knockout cups 100 into the mold openings 18 removes the patties therefrom.

On the return movement of the side racks 21 from their extended positions of FIG. 2 the side racks 21, mold plate 17, side bars 109 and knockout structure carried thereby move rearwardly as a unit. As can be seen in FIG. 2 the initial portion of this movement which is when the forward edges of the bars 109 first move rearwardly away from the side stops 108 causes the side rollers 113 to start up the upwardly inclined cam edges 106. This causes the knockout structure to be lifted raising the knockout cups 100 from their mold openings as at this stage the entire structure carried by the side bars 109 is moving at the same horizontal rate of speed as the mold plate 17 even though the mold plate 17 is traveling in a horizontal path while the knockout structure is traveling in an upwardly angled path due to the engagement of the rollers 113 with the inclined edges 106.

By the time the rollers reach the top of the inclined edges 106 or the position shown in FIG. 1 the cups have been completely removed from the mold openings and the engagement of the rear edges 172 of the slide blocks 110 with the adjacent vertical surfaces of the machine frame 29 causes the blocks 110 and the knockout structure carried thereby to stop its rearward motion. The side racks 21 and the attached mold plate 17, however, continue their rearward motion until the mold openings 18 are again aligned with the mold fill slots as illustrated by the fill slot 173 in the embodiment of FIG. 7.

As can be seen, the knockout or patty removal system is compact, simple in structure and very rapid as during its operation it moves with a horizontal component along with the mold plate and its drive structure.

DAMAGE PREVENTING SAFETY FEATURES

In order to prevent excess pressure caused by maladjustment of the machine from injuring the machine or the compressed material 64 each ram 15 at each mold opening 18 when the mold opening is in filling position as shown in FIGS. 3 and 6 is provided with a relief passage 114 leading from the vicinity of the mold opening 18 when the mold is in filling position back up into the supply 16 of the material. This provides a simple pressure release because the material at the supply 16 is under no feeding pressure as it is not affected by the reciprocation of the ram 15 until the material is in the compression chamber 13.

As the pressure on the compressed material 64 begins when the front or pressure end 115 of the ram 15 approaches and enters the compression chamber 13 pressure on the inclined end 63 of each pressure plate 14 forces the pressure plate rearwardly coincidentally with the approach of the mold openings 18 in the retracting mold plate 17. This rearward or opening movement of the valve plate 14 is resisted by the adjustable precompression spring 65 so that the compressed material 64 is under a force equivalent to that of the spring 65. This results in producing a compact patty 19 formed under any pressure desired which may be adjusted for the character of the moldable material such as the ground meat from which the patties are being formed.

If the pressure in the pressure chamber 13 becomes excessive as due to maladjustment of the machine by the operator the valve plate is forced rearwardly to such an extent (FIG. 3) that pressure relief passages 114 in the ram 15 are exposed to the space 64 so that this excess pressure material is vented back to the hopper 11.

When the mold plate 17 starts its movement from the filling position shown in FIG. 3 to the patty removal position shown in FIG. 4 the ram 15 begins its retraction movement by being drawn back by the drive bar 48. As soon as the pressure on the material 64 first begins to drop the spring 65 immediately moves the valve plate 14 to its forwardmost position of FIG. 4 thereby preventing compressed meat in the patties 19 from back flowing into the compression chamber and maintaining the firmness of the pressure formed patty.

As illustrated in FIG. 6 the pressure end 115 of each ram as it approaches the mold openings 18 forces the moldable material such as the fibrous containing ground meat into each mold opening 18 from the end and from the sides so that there is a certain amount of intermingling of the meat fibers which aids in the patty maintaining its round shape during cooking.

As illustrated in FIG. 2 and in enlarged fragmentary section in FIG. 5 the small agitator operating rack 87 and pinion 91 are held in position by the cover plate 92.

In the illustrated embodiment of FIG. 7 the valve plate 129 comprises a solid plastic plate 140 for almost all of its length except that at the front it abuts against a portion 128 that is of steel. Also in the embodiment of FIG. 7 the forward edge of the plate front portion 128 is provided with a bottom substantially flat flange 141. This flange 141 when the valve plate 129 is in its forwardmost position as illustrated by the plate 14 of the first embodiment is retained in a similarly shaped groove 143 in the bottom edge of the pressure plate 144. As is true in all embodiments the mold plate 17 slides between this top pressure plate and a bottom pressure plate 145.

THE RAM SEALS

The ram 123 as shown in enlarged detail in the embodiment of FIGS. 7-9 is sealed to the hopper 11 to prevent substantial leakage around the sides and bottom of the ram. The bottom of the ram is sealed by a transverse pressure bar 125 held in a vertical groove 126 so as to be movable relative to the bottom surface 127 of the ram. This bar 125 which may be made of steel is forced against the top surface of the front portion 128 of the valve plate 129 by the pressure of the meat 124 in the chamber 13.

In order to subject the top part of the pressure bar 125 to this pressure of the meat 124 there are provided in the illustrated embodiment four upwardly extending passages 130 that communicate with the groove 126 in which the pressure bar 125 is located. Each of these plurality of passages 130 communicate at their upper ends with a forwardly extending passage 131 whose front ends are open to the meat or the like 124 in the chamber 13. Thus as the pressure in this chamber 13 builds up the pressure is transmitted by the meat in the passages 130 and 131 as a hydraulic fluid to the top of the pressure bar 125. Thus the greater the pressure of the meat 124 the greater the downward sealing force on the pressure bar 125.

The sides of the ram 123 are sealed by pressure members 132 which may also be made of steel and which each comprises a vertically extending rectangular plate 133 positioned within a similarly shaped groove 134 on each side surface 135 of the ram 123. Each plate 133 is provided with a centrally located stem 136 at about its midpoint slidably held in a similarly shaped opening 137 that extends inwardly of the groove 134 and communicates with a forward opening passage 131. Thus, as can be seen in FIG. 9 the passages 130, 131 and 137 all join so that the pressure of the meat 124 in the compression chamber 13 operating through these passages simultaneously presses the bottom bar 125 and the side seal plates 133 into sealing engagement with the adjacent hopper surfaces.

THE PUMP FOR DISPOSING OF LEAKED MATERIAL

FIGS. 11–14 illustrate three embodiments of a plastic material or meat pump for disposing of any leaked material so that it cannot drop onto the top surfaces of the ejected shaped patties 19. This is important because in high capacity patty machines of the type disclosed and claimed herein the patties are customarily frozen and then arranged in stacks. Any particles of meat falling onto the top surfaces 146 of these patties after they have been removed from the mold openings 18 would cause the patties to have uneven thicknesses so that the frozen patties would not stack vertically.

Figure 11:
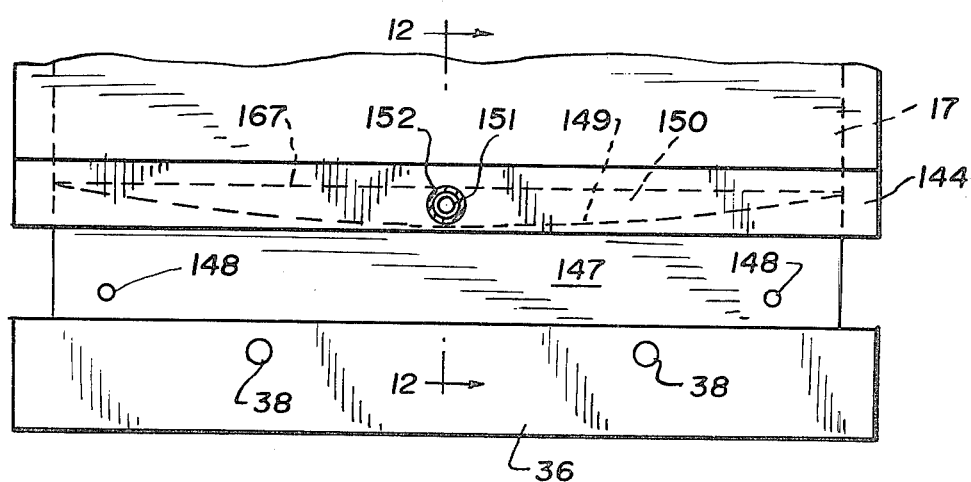
FIG. 11 is a fragmentary plan view of a further embodiment of the invention illustrating a pump which in this embodiment returns any leakage of moldable material to the hopper.
Figure 12:
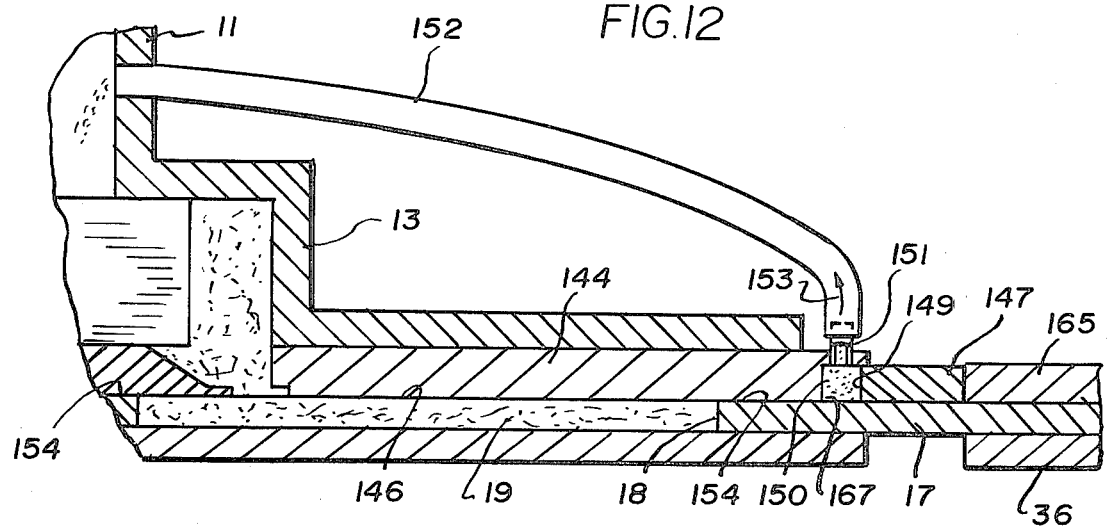
FIG. 12 is a fragmentary sectional view taken substantially along line 12—12 of FIG. 11.

A first embodiment of a meat pump is disclosed in FIGS. 11 and 12. In this embodiment the mold plate 17 at a position just forwardly of the mounting cross strips 165 and 36 carries a pump bar 147 attached to the mold plate 17 as by the attaching screws 148. This pump bar 147 on its forward surface is concavely curved from side to side to present the shallow arcuate surface 149. This forward edge of the bar 147 which forms the arcuate surface 149 is adapted to be received within a transversely extending pump chamber 150 in the adjacent edge of the top pressure plate 144. This pump chamber 150 communicates at about its midpoint with a short tube 151 which is joined to one end of a tube 152 whose other end extends through the wall forming the hopper 11. Plastic material such as meat and meat juices in front of the curved surface 149 on its movement toward the filling position of FIG. 12 is scraped from the top surface of the mold plate 17 against the edge 167 of the pressure plate 144 and compressed by the surface 149 within the pump chamber 150. This forces the material upwardly as indicated by the arrow 153 so that it is returned through the tube 152 back into the hopper 11. In this way not only is there no waste but there are no particles, crumbs, juices and the like free to fall on the top surfaces of the formed and ejected patties especially while they are being carried away on a conveyor. The result is that the patties being smooth on top are of uniform thickness and when frozen stack vertically and uniformly like oversize poker chips.

In this embodiment of FIGS. 11 and 12 the return tube 152 is positioned generally externally of the machine. It is contemplated, however, that in some embodiments of the machine the tube will be in the form of a hollow conduit built into the walls forming the machine so as to be concealed.

Figure 13:
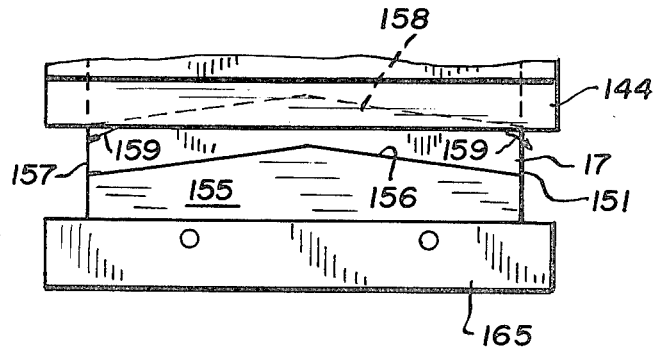
FIG. 13 is a reduced view similar to FIG. 11 illustrating another embodiment of a pump.

In the embodiment of FIG. 13 there is no provision made for the salvaging and return to the hopper of the leakage as here the pump bar 155 has a forward surface 156 that is convex rather than concave as shown at 149 in the first embodiment of FIGS. 12 and 13. The edge surface 156 has sides sloped toward the outer edges 157 of the mold plate so that when the forward edge surface 156 enters the correspondingly shaped pump chamber 158 the plastic material such as meat and meat juices will be directed toward the sides of the mold plate as indicated by the arrows 159 so that this leakage (which is always very small in volume compared to the amount of material being molded) can be collected and disposed of.

Figure 14:
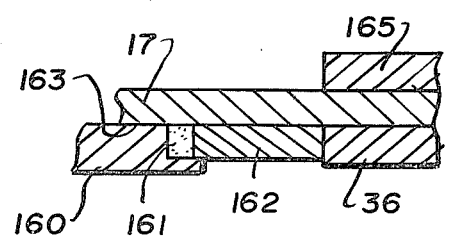
FIG. 14 is a fragmentary sectional view similar to a portion of FIG. 12 but illustrating still another embodiment of a pump.

Another embodiment of the pump is illustrated in FIG. 14 and here the bottom pressure plate 160 contains the pressure pump chamber 161. In this embodiment the pump bar 162 is attached to the bottom surface of the mold plate 17 so that the pump combination gathers any leakage on the bottom surface 163 of the mold plate and disposes of it in a manner similar to that of the first two embodiments thereby preventing it dropping off onto the formed patties as described earlier. If desired, the machine may contain two pairs of pump chambers and pump bars: one on top as shown at 147 and 155 and the other on the bottom as shown at 162.

THE OPERATION OF THE MACHINE

The operation of the machine is believed to be clear from the above description of the structure and the cooperation of the parts thereof. All movable parts are operated from the electric motor 30 and the attached drives and linkages as described. During the operation the plastic material in the bottom of the hopper lower section is acted upon by the reciprocating ram 15 which when reciprocated between the extreme positions of FIGS. 3 and 4 and back to FIG. 3 compresses the material in the chamber 13 and causes the force of this material as illustrated at 64 to operate against the front end 63 of the valve plate 14 and move it toward retracted position where the compressed material 64 is free to move into the mold openings 18 and form the highly compressed patties 19.

If because of maladjustment of the parts of the machine as by a careless operator there is a condition of abnormally high pressure being applied to parts of the machine, these parts will not be damaged as the high pressure will force the valve plate 14 rearwardly to an extreme position to expose the safety relief passages 114 that extend through the ram 15 so that the pressurized material will be returned to the lower section 12 of the hopper, thereby relieving the excess pressure and preventing damage.

When the ram 15 is retracted from the position of FIG. 3 toward the position of FIG. 4 the pressure at 64 is immediately relieved so that the spring urged valve plate 14 is returned quickly to its closed position of FIG. 4 thereby preventing the compressed material in the patties 19 from back-flowing into the compression chamber 13.

During the movement of the mold plate 17 from the retracted position of FIGS. 1 and 3 toward the extended position of FIGS. 2 and 4 where the mold openings are in position for removal of the contained patties 19, the knockout cups 100 and associated structure travel along with the mold plate 17. At the extended knockout position the supporting structure 109 for the knockouts engage the stops 108 (FIG. 2). At this extended knockout position the bottoms of the vertical slide rods 104 drop into the vertical openings 118 in the bottom racks 21 thereby permitting the side springs 119 to snap the cups 100 into the mold openings 18 and dislodge the formed patties 19 which, in the embodiment of FIG. 2, fall onto the traveling conveyor 174.

Then as the bottom racks 21 are retracted back to the filling position for the mold openings 18 the knockout cups 100 and the supporting structure 109 therefor travel with the rack 21 and mold plate 17. This motion has a vertical component caused by the upward inclined cam edges 106 of the side cams 105 and this raises the knockout cups from the mold openings 18. As soon as the cups have been removed from the openings the support structure 109 stops due to the engagement of the slide blocks end 172 with the frame 29 of the machine which thereby acts as a stop. The side racks 21 and the mold plate 17 continue to their retracted position preparatory to again filling the mold openings 18 with material to form the patties 19. The removal motion is thereupon repeated for successive series of transversely aligned patties 19 on the conveyor. In order to prevent substantial leakage from the high pressure material around the ram particularly in the vicinity of the compression chamber 13 which is at the front end of the ram, seals are provided as illustrated in the embodiment of FIGS. 7–9. Here the ram 123 is provided with a bottom sealing bar 125 and side sealing blocks or plates 133 and these are moved outwardly into sealing engagement with the adjacent hopper surfaces by means of the pressurized material 124 operating through passages 130, 131 and 137 to press these sealing elements into close engagement with the hopper side surfaces. In order to clean the top or bottom or both of the mold plates 17 of leaked plastic material such as particles of meat and meat juices and prevent it falling on the top surfaces 146 of the ejected patties there is provided a meat pump which is disclosed in three embodiments in FIGS. 11–14. As is shown in the embodiment of FIGS. 11 and 12 the forward surface 149 of a pump bar 147 gathers the leaked material on the top surface 154 of the mold plate 17 by confining it between this curved surface 149 and the pump chamber 150. This compresses the material as shown in FIG. 12 and forces it up through the tube 152 back into the hopper 11 in this embodiment.

In the embodiment of FIG. 13 this material is not salvaged but is directed as indicated by the arrows 159 off the side edges 154 of the mold plate where it is ejected away from the formed meat patties 19.

In the embodiment of FIG. 14 a similar pump bar 162 is used and a similar pump chamber 161 but here the chamber and bar are on the bottom surface of the mold plate 17 so as to intercept and remove leakage on this bottom surface. Obviously, a combination of the top and bottom pumps could be used, if desired.

Having described my invention as related to the embodiments shown in the accompanying drawings, it is my intention that the invention be not limited by any

I claim:

1. Molding apparatus, comprising: a cabinet; a movable mold on said cabinet having a shaping opening for forming a shaped article from moldable material; supply means for providing said moldable material to said shaping opening, said supply means having a supply passage in said cabinet; means for moving said mold over a fixed path including a first range of movement between a filling position for said opening within said cabinet communicating with said passage and a discharge position for said shaping opening located externally of said supply passage; article removing means at said discharge position for removing said shaped article from said shaping opening; means operatively interconnecting said mold and said removing means for conjoint movement of said removing means with said mold generally parallel to said path when said mold opening is adjacent to said discharge position; means for terminating said conjoint movement thereafter; and means located at said discharge position for moving said removing means generally transversely to said path into and out of said shaping opening during said conjoint movement for said removing of said article from said shaping opening, said conjoint movement being over a second range of movement that is only a minor fraction of said first range of movement of said mold, said means for moving said removing means out of said shaping opening comprising a cam means operatively engaging said removing means during said second range of movement.

2. The apparatus of claim 1 wherein there is provided a bracket means externally of said cabinet and on which said cam is located, said bracket being provided with said spaced stop means.

* * * * *